US012640795B2

(12) United States Patent
Alkhateeb et al.

(10) Patent No.: US 12,640,795 B2
(45) Date of Patent: May 26, 2026

(54) CHANNEL STATE INFORMATION SWITCHING PREDICTION

(71) Applicant: TeraSpatial, Inc., Palo Alto, CA (US)

(72) Inventors: Ahmed Alkhateeb, Chandler, AZ (US); Ramya Srinivasan, San Jose, CA (US); Yu Zhang, Frisco, TX (US); Jeyanandh Paramesh, Pittsburgh, PA (US); Dhinakarraj Gantala, Austin, TX (US)

(73) Assignee: TeraSpatial, Inc., Palo Alto, CA (US)

( * ) Notice: Subject to any disclaimer, the term of this patent is extended or adjusted under 35 U.S.C. 154(b) by 0 days.

(21) Appl. No.: 19/247,920

(22) Filed: Jun. 24, 2025

(65) Prior Publication Data

US 2026/0066970 A1 Mar. 5, 2026

Related U.S. Application Data

(60) Provisional application No. 63/664,523, filed on Jun. 26, 2024.

(51) Int. Cl.
*H04B 7/06* (2006.01)
*H04L 5/00* (2006.01)
*H04L 41/16* (2022.01)

(52) U.S. Cl.
CPC ......... *H04B 7/0626* (2013.01); *H04B 7/0639* (2013.01); *H04L 5/0005* (2013.01); *H04L 41/16* (2013.01)

(58) Field of Classification Search
CPC ... H04B 7/0626; H04B 7/0639; H04L 5/0005; H04L 41/16
USPC .......................................................... 370/329
See application file for complete search history.

(56) References Cited

U.S. PATENT DOCUMENTS

| | | | |
|---|---|---|---|
| 2021/0250834 A1* | 8/2021 | Cirkic ................... | H04W 36/00 |
| 2021/0266950 A1* | 8/2021 | Namgoong ....... | H04W 72/0473 |
| 2021/0345131 A1* | 11/2021 | Pezeshki ........... | H04W 72/0453 |
| 2022/0294666 A1* | 9/2022 | Jeon .................... | H04L 25/0254 |
| 2025/0211302 A1* | 6/2025 | Merwaday .......... | H04B 7/0617 |
| 2025/0274233 A1* | 8/2025 | Cheema ............. | H04L 27/2678 |
| 2025/0374093 A1* | 12/2025 | Hu ........................ | H04L 5/0048 |

* cited by examiner

*Primary Examiner* — Mark G. Pannell
(74) *Attorney, Agent, or Firm* — Van Pelt, Yi & James LLP

(57) ABSTRACT

Data associated with a coverage area of a base station is obtained. A model is trained based in part on the obtained data associated with the coverage area. The trained model is deployed to make inferences for one or more user equipment (UE) located in the coverage area. A corresponding recommended reference signal outputted by the trained model is utilized to decide on an approach for estimating corresponding channels associated with the one or more UE located in the coverage area.

21 Claims, 5 Drawing Sheets

200

200

Obtain Data Associated With A Coverage Area — 202

Train Model — 204

Deploy Model To Perform Inference In Real-Time — 206

Utilize Recommended Reference Signal To Estimate The Channel — 208

300

DU Operates as normal — 302

No

Should This UE Be Selected For Data Collection? — 304

Yes

Schedule the UE to Obtain CSI-RS and SRS channel and throghput measurements — 306

Store The UE Measurements — 308

Sufficient? — 310

Yes

Send UE Measurements To Model As Training Data — 312

CHANNEL STATE INFORMATION SWITCHING PREDICTION

CROSS REFERENCE TO OTHER APPLICATIONS

This application claims priority to U.S. Provisional Patent Application No. 63/664,523 entitled CSI-SWITCHING PREDICTION filed Jun. 26, 2024 which is incorporated herein by reference for all purposes.

BACKGROUND OF THE INVENTION

Channel State Information-Reference Signal (CSI-RS) is a downlink reference signal used in 5G and LTE-Advanced cellular networks. This signal is transmitted by a base station to help user equipment (UE) (e.g., mobile phone) estimate the state of the radio channel and to report the estimated state back to the base station. These measurements allow the base station to adapt transmission techniques (e.g., beamforming, MIMO) and optimize modulation and coding schemes. CSI-RS helps the network assess downlink channel conditions for efficient data delivery.

Sounding Reference Signal (SRS) is an uplink reference signal in 4G LTE and 5G networks. This signal is transmitted from the UE to a base station, enabling the base station to measure the uplink channel quality. These measurements help the base station plan uplink resource allocation and enable uplink beamforming. SRS provides the network with insight into the uplink channel conditions, supporting more efficient uplink transmissions.

Both CSI-RS and SRS are reference signals that provide channel state information in different directions. Together, they enable channel acquisition by helping the network build a complete picture of how the radio channel behaves, including its signal strength, interference, and fading. This comprehensive understanding allows for adaptive and efficient communication through transmission and reception adjustments (e.g., beamforming, power control, and scheduling). However, selecting the wrong reference signal or misconfiguring it prevents the network from properly acquiring channel state information, leading to lost connections (when the UE or base station cannot decode transmissions) and degraded performance (due to poor decisions on modulation, power, and scheduling, resulting in slow and unreliable links).

BRIEF DESCRIPTION OF THE DRAWINGS

Various embodiments of the invention are disclosed in the following detailed description and the accompanying drawings.

DETAILED DESCRIPTION

Figure 1:
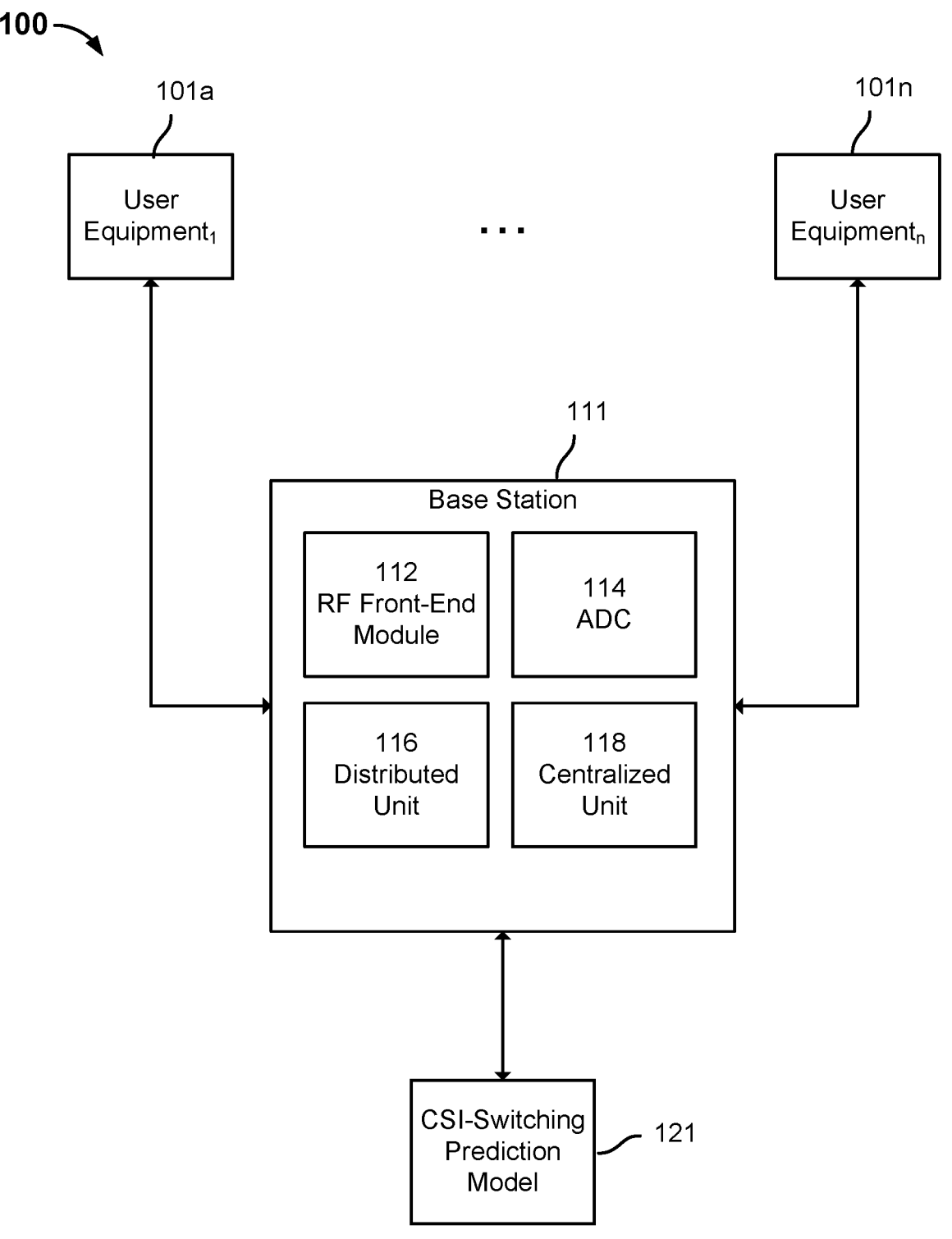
FIG. 1 is a block diagram illustrating a system to adaptively switch between SRS-based and CSI-RS-based channel measurements in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Systems and methods to adaptively switching between SRS-based and CSI-RS-based channel measurements are disclosed herein. If the base station uses CSI-RS to estimate the downlink channel, but the UE cannot properly measure it (e.g., due to incorrect configuration, interference, or the signal not being scheduled properly), then the UE cannot provide accurate Channel State Information (CSI) feedback. As a result, the base station may make incorrect decisions about beamforming, modulation, or power levels, potentially leading to failed demodulation (where the UE can't decode the signal) or even a dropped connection. Similarly, if the uplink SRS is configured incorrectly (wrong frequency, timing, or spatial configuration), the base station cannot accurately measure the uplink channel. This can prevent proper uplink scheduling, cause scheduling collisions or resource block allocation errors, or even result in the failure to decode the UE's data. Even if the link doesn't drop, the network might select sub-optimal settings, such as Modulation and Coding Schemes (MCS) that result in lower throughput than possible, poor or no beamforming that reduces signal strength, and inappropriate power levels (too weak or too strong). This can lead to lower data rates, increased latency, and reduced reliability, including more packet losses and retransmissions.

Current systems can measure link quality at the user's current location and under current conditions (e.g., interference, fading, obstacles, etc.). For example, at a certain position in the cell, the signal may be strong and of high quality. However, predicting how the signal will change as the user moves, such as one or two meters from their current location, is difficult. Radio signals can fluctuate significantly with even small movements, as buildings, cars, or trees may block or reflect signals differently. Consequently, the link quality (i.e., the user's ability to send and receive data) can change unexpectedly as the user moves. To maintain a reliable connection, the base station must adapt quickly to these changes by implementing the techniques disclosed herein.

The systems and methods disclosed herein predict which channel acquisition method to utilize and when to switch between a first and second channel acquisition method. In some embodiments, the first channel acquisition method is SRS and the second channel acquisition method is CSI-RS. At the UE's initial position, the UE may have strong uplink connectivity, allowing the network to utilize SRS to estimate the uplink channel accurately from the UE to the base station. The network may then utilize this information to make uplink scheduling and beamforming decisions. As the UE moves to a subsequent position (e.g., one or two meters from the initial position), the environment may change; for example, a building, a vehicle, or tree may partially block the signal, or multipath effects (signal reflections) may distort the SRS signal. Instead of continuing to utilize SRS to obtain channel state information, the base station may switch from SRS to CSI-RS. At the subsequent position, the downlink signal from the base station may still be strong (due to clear line-of-sight or good reflections). The UE can then measure the downlink CSI-RS and send that information back to the base station. Compared to SRS, CSI-RS may provide more accurate or stable channel measurements under these conditions. This enables adaptive transmission techniques (e.g., beamforming, scheduling, power control, and maintaining a strong, reliable connection). In some embodiments, the first channel acquisition method is CSI-RS and the second channel acquisition method is SRS.

Training data for a predictive model is obtained. An environment (e.g., a cell or a sector) may include one or more UEs. A distributed unit (DU) selects one of the one or more UEs and uses a particular time window (e.g., 10 frames) to collect information associated with the selected UE. The obtained information may include CSI-RS and SRS measurements, CSI-RS and SRS throughput, a number of MU-MIMO UEs, and a number of layers/UE. The DU stores the obtained information and repeats this process for the selected UE while it remains in the cell served by the base station. In some embodiments, the process is repeated for a particular number of consecutive time windows (e.g., 5 time windows).

The predictive model is trained utilizing the training data. The DU stores training data associated with a plurality of UEs. The training data associated with the plurality of UEs may be collected over a particular time period (e.g., one month, six months, one year, etc.). For example, for a site of 500 m×500 m, approximately 40,000 measurements in aggregate from multiple UEs may be obtained.

In some embodiments, the predictive model is trained using supervised learning. A sequence of measurements in the training data is labeled with a corresponding preferred channel acquisition method based on the obtained information of the time windows associated with the sequence of measurements. In some embodiments, the corresponding preferred channel acquisition method is CSI-RS. In some embodiments, the corresponding preferred channel acquisition method is SRS. In other embodiments, the predictive model is trained using unsupervised learning, semi-supervised learning, or reinforcement learning.

The trained predictive model is deployed in production. A sequence of SRS channel estimate or CSI-RS Channel Quality Indicator (CQI)/Precoding Matrix Indicator (PMI) reports is obtained. The sequence of SRS channel estimates includes multiple measurements showing how the uplink channel quality changes. The sequence of CSI-RS CQI/PMI reports includes a plurality of CSI-RS measurements and which beamforming or MIMO configuration to use based on the CSI-RS measurements. The base station utilizes the sequence information and the trained predictive model to decide how to schedule the UE, including which time slots, frequency blocks, and resources to allocate. The base station chooses the appropriate modulation and coding scheme for the link. The base station configures beamforming or precoding to maximize the signal quality and throughput. The base station adjusts power levels to manage interference and maintain a reliable connection.

Based on the decisions made using CSI-RS and SRS information, the base station sends or receives data from the UE with optimized parameters. This ensures higher throughput, lower latency, and better reliability for the UE.

FIG. 1 is a block diagram illustrating a system to adaptively switch between SRS-based and CSI-RS-based channel measurements in accordance with some embodiments. In the example shown, system 100 includes UE 101a, UE 101n, and base station 111. System 100 is associated with base station 111's coverage area (i.e., a cell). For example, the coverage area may be a 250 m×250 m cell.

Figure 4:
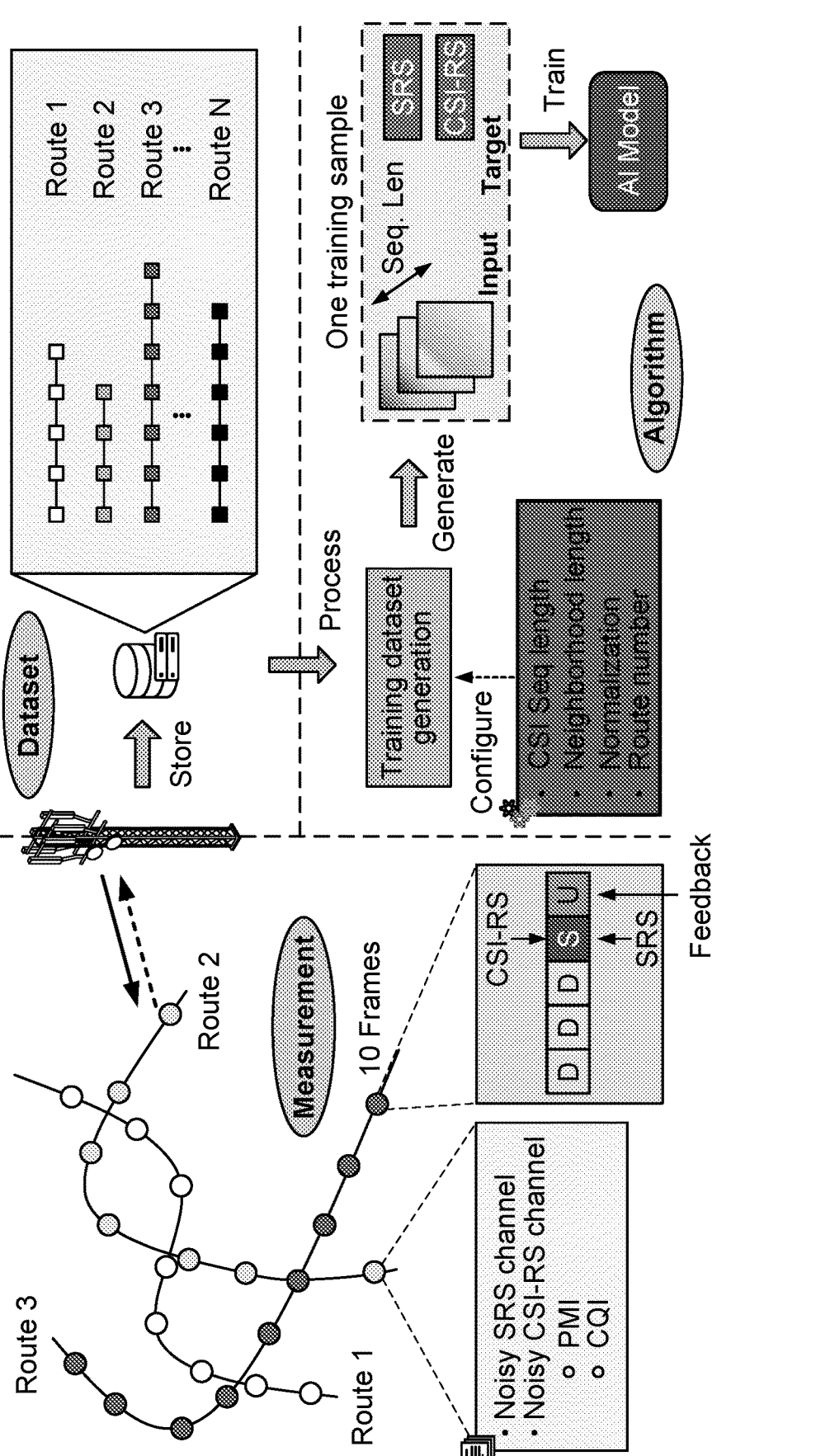
FIG. 4 is a diagram illustrating a detection and collection phase in accordance with some embodiments.

Although FIG. 1 depicts two UEs, system 100 may include 1:n UEs. UE 101a . . . 101n may be a smartphone, a cell phone, a tablet, a laptop with a cellular modem, an IoT device, a wireless terminal, a mobile hotspot, or any other device capable of connecting to a cellular network. UE 101a . . . 101n are configured to move in a plurality of different directions in the environment. As seen in FIG. 4, a first UE may traverse a first route within the environment, a second UE may follow a second route, and a third UE may travel along a third route. In some embodiments, the route associated with a first UE partially overlaps with the route associated with a second UE. In some embodiments, the route associated with a first UE completely overlaps with the route associated with a second UE. In some embodiments, the route associated with a first UE is distinct from and does not intersect with the route associated with a second UE.

Base station 111 includes RF front-end module 112, which is configured to receive and filter an uplink signals associated with UE 101a through UE 101n. RF front-end module 112 includes one or more antennas, a duplexer or filter to separate uplink signal and downlink signals, and low-noise amplifiers.

Base station 111 includes an analog-to-digital converter (ADC) 114, which converts the analog uplink signal into digital form for further processing.

Base station 111 includes distributed unit (DU) 116, which handles real-time radio processing tasks for wireless communication. It manages physical layer tasks like OFDM modulation/demodulation, channel coding, and beamforming, as well as parts of the MAC layer such as user scheduling and HARQ. These time-critical processes ensure reliable data transmission over the radio interface. Located close to the cell site, distributed unit 116 is integrated with RF Front-End Module 112 and Centralized Unit 118 to minimize latency and provide seamless wireless service.

Base station 111 includes centralized unit (CU) 118, which is responsible for handling higher-layer processing and control functions that are less latency-sensitive than those managed by DU 116. CU 118 performs tasks such as Radio Resource Control (RRC), which manages connections, mobility, and security between the UE and the network, as well as Packet Data Convergence Protocol (PDCP) functions, including header compression, ciphering, and packet reordering. By managing these control and user-plane tasks, CU 118 ensures session management, mobility support, and connectivity between the radio access network and the core network, enabling the network to adapt to user demands and maintain service quality.

DU 116 is configured to train CSI-Switching Prediction Model 121. In some embodiments, CSI-Switching Prediction Model 121 is located in base station 111. In some embodiments, CSI-Switching Prediction Model 121 is located on-premises in a server. CSI-Switching Prediction Model 121 is located in a cloud environment on a cloud server.

Base station 111 is configured to obtain training data for CSI-Switching Prediction Model 121. The training dataset is comprised of n routes associated with UE 101a . . . 101n. Each route is associated with a plurality of time windows. A time window is comprised of a plurality of frames (e.g., 10 frames). One or more frames within the time window may include reference signal transmissions, such as CSI-RS transmitted by the base station or SRS transmitted by the UE. Based on these transmissions, feedback may be determined by the UE (in the case of CSI-RS) or by the base station (in the case of SRS). The training dataset may be stored by base station 111, on an on-prem server, a remote server, or a cloud server.

Base station 111 is configured to provide the training dataset to CSI-Switching Prediction Model 121. CSI-Switching Prediction Model 121 is trained using supervised training. A sequence of measurements in the training data is labeled with a corresponding preferred channel acquisition method based on the obtained information of the time windows associated with the sequence of measurements. In other embodiments, CSI-Switching Prediction Model 121 is trained using unsupervised training, semi-supervised training, or reinforcement training.

After being trained, base station 111 is configured to deploy CSI-Switching Prediction Model 121 to predict which channel acquisition method to use in one or more subsequent time windows based on a set of inputs provided by base station 111 to CSI-Switching Prediction Model 121. The set of inputs may include unprocessed SRS, a Channel State Information Reference Signal (CSI-RS) report, User Equipment Cell Radio Network Temporary Identifier (UE C-RNTI), and a timestamp. The CSI-RS report includes information such as a rank indicator, a precoding matrix indicator, a channel quality indicator, and a timestamp. The rank indicator indicates a number of MIMO layers the channel can support. The precoding matrix indicator indicates which precoding matrix the UE prefers the base station to use for downlink transmission. The channel quality indicator is a numerical value that indicates the quality of the downlink channel. The base station uses the UE C-RNTI to schedule messages, map control messages, and link MAC and RLC layers to a specific UE session.

In some embodiments, CSI-RS is currently being implemented and CSI-Prediction Model 121 recommends that base station 111 utilize CSI-RS for the next time window. In some embodiments, CSI-RS is currently being implemented and CSI-Prediction Model 121 recommends that base station 111 utilize SRS for the next time window. In some embodiments, SRS is currently being implemented and CSI-Prediction Model 121 recommends that base station 111 utilize SRS for the next time window. In some embodiments, SRS is currently being implemented and CSI-Prediction Model 121 recommends that base station 111 utilize CSI-RS for the next time window. CSI-Switching Prediction Model 121 continues to make inferences when UE 101a . . . 101n are located in a coverage area associated with base station 111.

DU 116 utilizes the recommend reference signal to estimate the channel. In some embodiments, SRS is utilized to estimate the uplink channel. In some embodiments, CSI-RS is utilized to estimate the downlink channel. Base station 111 adjusts a UE's transmission parameters based on the corresponding channel estimate.

Figure 2:
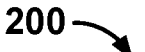
FIG. 2 is a flow diagram illustrating a process to adaptively switch between SRS-based and CSI-RS-based channel measurements in accordance with some embodiments.
Figure 2:
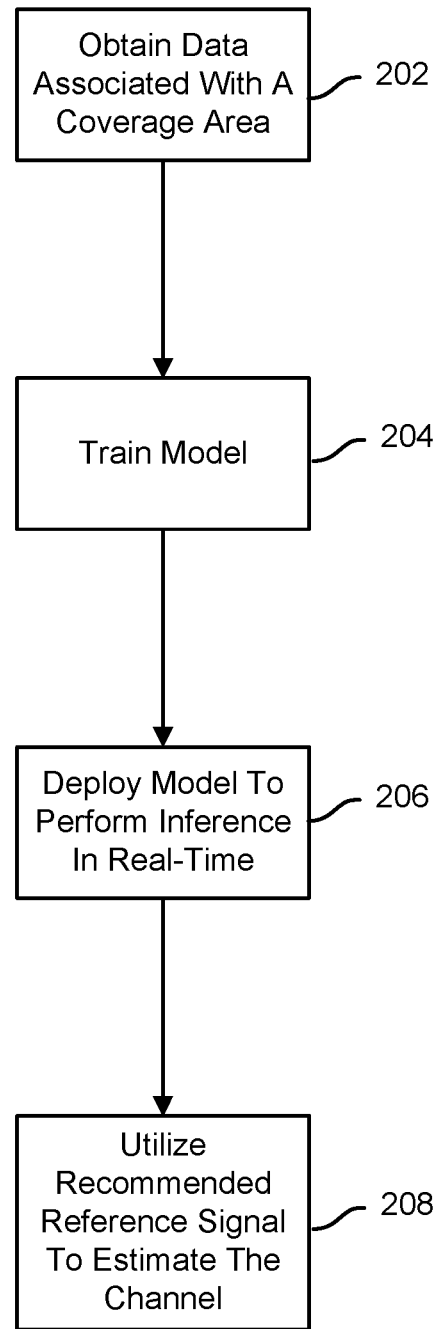

FIG. 2 is a flow diagram illustrating a process to adaptively switch between SRS-based and CSI-RS-based channel measurements in accordance with some embodiments. In the example shown, process 200 may be implemented by a base station, such as base station 111.

At 202, data associated with a coverage area is obtained. A UE within the coverage area provides to the base station unprocessed SRS, a Channel State Information Reference Signal (CSI-RS) report, User Equipment Cell Radio Network Temporary Identifier (UE C-RNTI), and a timestamp. The CSI-RS report may include information such as a rank indicator, a precoding matrix indicator, a channel quality indicator, and a timestamp. The rank indicator indicates a number of MIMO layers the channel can support. The precoding matrix indicator indicates which precoding matrix the UE prefers the base station to use for downlink transmission. The channel quality indicator is a numerical value that indicates the quality of the downlink channel. The base station uses the UE C-RNTI to schedule messages, map control messages, and link MAC and RLC layers to a specific UE session.

In some embodiments, the base station utilizes the unprocessed SRS to estimate the SRS channel and to compute the Signal-to-Interface-plus-Noise Ratio (SINR). The base station may utilize the SRS to estimate how much throughput it could schedule. The base station may utilize SRS to estimate the channel matrix, then analyzes that matrix (e.g., using SVD) to determine the number of spatial layers it can support per UE.

The base station computes the number of layers/UE for SRS.

In some embodiments, each selected UE is configured to report CSI-RS during one sounding slot (s-slot) in every even-numbered frame. Similarly, each selected UE is configured to transmit an SRS during one s-slot in every odd-numbered frame. The base station receives the CSI-RS or SRS reports and uses the resulting channel measurements to design a precoding matrix tailored to the current channel conditions. Based on the selected precoder, the base station may then compute the expected throughput for each UE or transmission link, enabling adaptive transmission strategies that improve overall spectral efficiency.

In some embodiments, each selected UE is configured to report CSI-RS measurements during a designated sounding slot (s-slot) in each even-numbered frame. Similarly, each selected UE is configured to transmit an SRS during a designated s-slot in each odd-numbered frame. The base station may utilize the received CSI-RS and SRS measurements to estimate the expected throughput for each respective reporting mode. These throughput estimations may inform link adaptation or be used in predictive CSI-switching logic. Notably, the CSI-RS and SRS reporting described herein may be performed without disrupting or interfering with the UE's normal CSI-RS and SRS reporting operations used for standard scheduling procedures, thereby preserving standard uplink and downlink resource allocation behavior.

At 204, a model is trained. The obtained data associated with the coverage area is stored and provided to a device on which the model is hosted. In some embodiments, the model is hosted on a cloud server in a cloud platform (e.g., Amazon Web Services, Google Cloud, Microsoft Azure, etc.). In some embodiments, the model is trained using measurement data collected over more than 10,000 radio frames. Given that each radio frame has a duration of 10 ms, this corresponds to a training period exceeding 100 seconds.

In some embodiments, the described approach introduces no additional overhead for CSI-RS reporting, and no extra radio resources are required to calculate throughput based on the existing CSI-RS or SRS measurements. However, performance degradation may occur due to the alternating use of SRS and CSI-RS for channel measurement, as each reference signal type may be used less frequently compared to a configuration that relies solely on one.

In some embodiments, the approach introduces no additional overhead for CSI-RS reporting. Furthermore, the calculation of throughput may be performed at the distributed unit (DU) using minimal computational resources.

At 206, the model is deployed to perform inference in real-time. The base station receives a sequence of data instances representing the current channel conditions. During a designated measurement period (e.g., 10 milliseconds), either SRS or CSI-RS measurements are performed. Based on these measurements and input features, the model generates predictions for a subsequent set of frames, such as the next 1 to 10 frames. The model may be configured to generate predictions at regular intervals, for example, every 10 to 100 milliseconds. If the model determines that a switch in channel state reporting is beneficial, the model may transmit a control signal to the DU, specifying the recommended CSI reporting mode (e.g., SRS or CSI-RS) for the upcoming frame window (e.g., 10 frames).

In some embodiments, the model may recommend that the base station utilize SRS-based measurements for a subsequent set of frames. In other embodiments, the model may recommend using CSI-RS-based measurements for the upcoming frame interval.

In one approach, during normal operation over a 10-frame window, the UE continues to report either CSI-RS or SRS in each frame, consistent with its current configuration. The base station uses the reported reference signals to derive channel estimates, design a corresponding precoding matrix, and compute throughput based on the precoder. In an alternative approach, similar UE behavior is maintained—namely, reporting either CSI-RS or SRS every frame—but the underlying reporting mode may be selectively modified based on model predictions. In both approaches, throughput is estimated at the base station using the received reference signal measurements, and the UE's reporting behavior remains compatible with standard scheduling procedures.

At 208, the recommend reference signal is utilized estimate the channel. In some embodiments, SRS is utilized to estimate the uplink channel. In some embodiments, CSI-RS is utilized to estimate the downlink channel. The base station adjusts the UE's transmission parameters based on the corresponding channel estimate.

Figure 3:
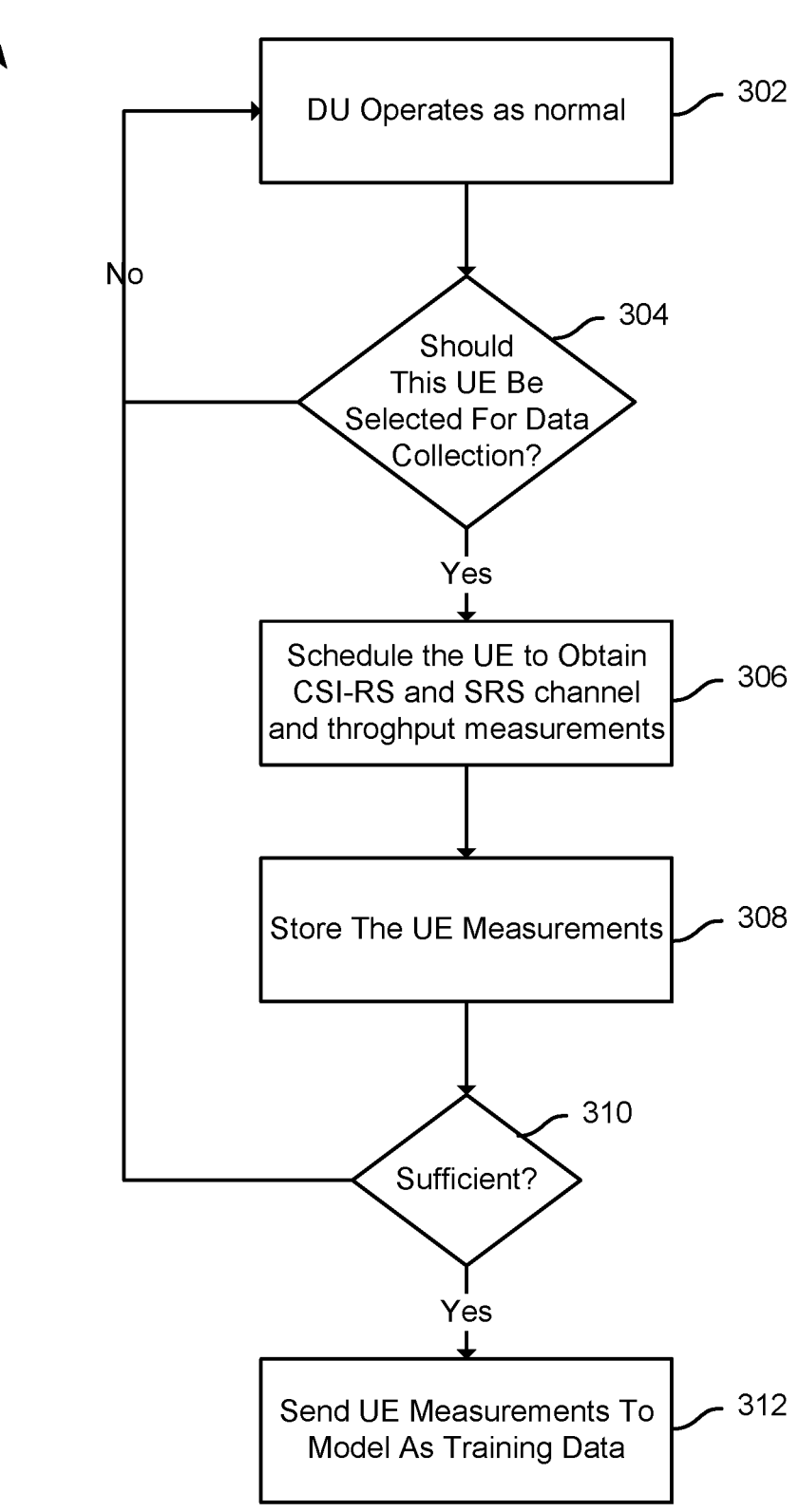
FIG. 3 is a flow diagram illustrating a process obtain data associated with a coverage area in accordance with some embodiments.

FIG. 3 is a flow diagram illustrating a process obtain data associated with a coverage area in accordance with some embodiments. In the example shown, process 300 may be implemented by a base station, such as base station 111. Process 300 may be implemented to perform some of step 202 of process 200.

At 302, the DU operates as normal. The DU operates in a normal mode, wherein it performs its standard processing functions without interruption or modification. For example, the DU may continue to execute Layer 1 and Layer 2 protocol stack operations, including scheduling, modulation, demodulation, and hybrid automatic repeat request (HARQ) processing. The DU maintains communication with the CU over a logical connection (e.g., the F1 interface) and handles uplink and downlink data in accordance with configured radio resource control (RRC) parameters. No fallback, error recovery, or load-shifting procedures are invoked, and the DU processes signals, control information, and user data as specified in its typical operational state.

At 304, for each UE in an environment associated with the base station, it is determined whether the UE should be selected for data collection. In some embodiments, a UE is randomly selected. In some embodiments, a UE with low quality of service or throughput requirements is selected.

In response to a determination that the UE should be selected for data collection, process 300 proceeds to 306. In response to a determination that the UE should not be selected for data collection, process 300 returns to 302.

At 306, the UE is scheduled to obtain CSI-RS and SRS channel and throughput measurements. The UE may obtain measurements of the CSI-RS channel, the SRS channel, and throughput measurements over a particular time period (e.g., 10 frames).

At 308, the UE measurements are stored. The UE measurements may be stored at the base station, an on-prem device, a remote device, and/or in a cloud storage.

At 310, it is determined whether there are a sufficient number of UE measurements. In response to a determination that there are a sufficient number of UE measurements, process 300 proceeds to 308. In response to determination that there are not a sufficient number of UE measurements, process 300 returns to 302.

At 312, the UE measurements are provided to a model as training data. In some embodiments, the UE measurements are labeled and used to train the model using supervised learning techniques. In other embodiments, the model is training using unsupervised learning, semi-supervised learning, or reinforcement learning, depending on the availability of labels and the desired learning objectives.

Figure 5:
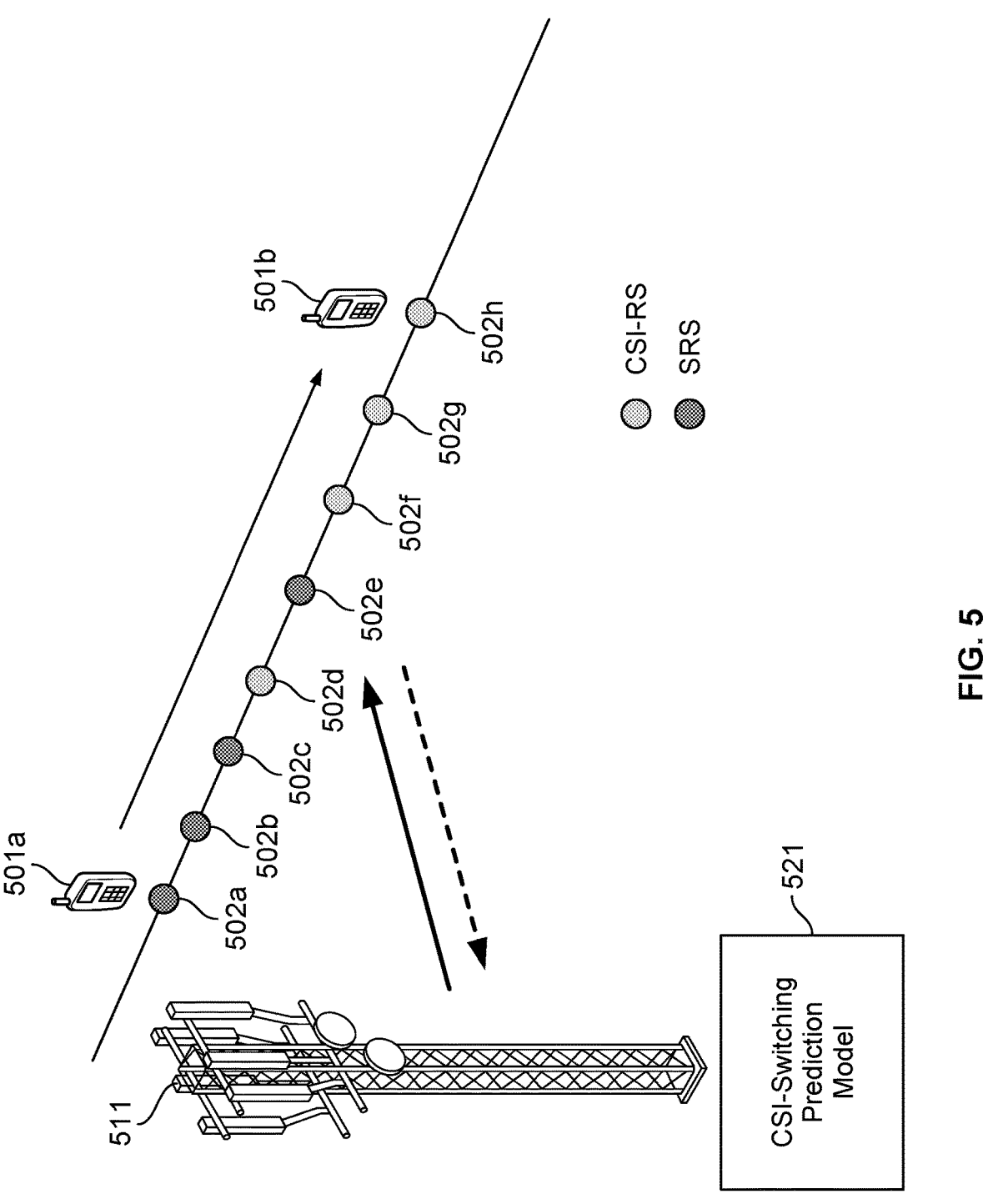
FIG. 5 is a diagram illustrating a base station adaptively switching between SRS-based and CSI-RS-based channel measurements in accordance with some embodiments.

FIG. 5 is a diagram illustrating a base station adaptively switching between SRS-based and CSI-RS-based channel measurements in accordance with some embodiments. In the example shown, base station 511 utilizes CSI-switching prediction model 521 to determine which channel measurement to use for a UE at a plurality of different positions. The UE has moved from an initial position 501a to a subsequent position 501b. Using an inference from CSI-Switching Prediction Model 521, base station 511 has adaptively switched between SRS-based channel measurements and CSI-RS-based channel measurements at a plurality of locations 502a, 502b, 502c, 502d, 502e, 502f, 502g, 502h. CSI-Switching Prediction Model 521 has determined to use CSI-RS measurements for 502d, 502f, 502g, and 502h. CSI-Switching Prediction Model 521 has determined to use SRS measurements for 502a, 502b, 502c, and 502e.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

obtaining data associated with a coverage area of a base station;

training a model based in part on the obtained data associated with the coverage area;

deploying the trained model to make inferences for one or more user equipment (UE) located in the coverage area; and utilizing a corresponding recommended reference signal outputted by the trained model to decide on an approach for estimating corresponding channels associated with the one or more UE located in the coverage area.

2. The method of claim 1, wherein obtaining data associated with the coverage area of the base station includes performing a plurality of channel state information-reference signal (CSI-RS) measurements and a plurality of sounding reference signal (SRS) measurements within the coverage area of the base station.

3. The method of claim 2, wherein the plurality of CSI-RS measurements and the plurality of SRS measurements are associated with the one or more UEs.

4. The method of claim 3, where the one or more UEs have a corresponding route.

5. The method of claim 1, wherein obtaining the data associated with the coverage area of the base station includes collecting information for a selected UE of the one or more UE for a plurality of time windows.

6. The method of claim 5, wherein the collected information for the selected UE includes one or more of CSI-RS and SRS measurements, CSI-RS and SRS throughput, a number of MU-MIMO UEs, and a number of layers/UE.

7. The method of claim 5, wherein the selected UE is randomly selected.

8. The method of claim 7, wherein each time window of a plurality of time windows is labeled with a corresponding preferred channel acquisition method.

9. The method of claim 5, wherein the selected UE is selected based on quality of service or throughput requirements.

10. The method of claim 9, wherein the corresponding preferred channel acquisition method is CSI-RS.

11. The method of claim 9, wherein the corresponding preferred channel acquisition method is SRS.

12. The method of claim 1, wherein the trained model is a supervised machine learning model.

13. The method of claim 1, wherein deploying the trained model includes obtaining a sequence of SRS channel estimate or CSI-RS Channel Quality Indicator and Precoding Matrix Indicator reports.

14. The method of claim 1, wherein the sequence of SRS channel estimate or the CSI-RS Channel Quality Indicator and Precoding Matrix Indicator reports, and the trained model are utilized to decide how to schedule the one or more UEs, including which time slots, frequency blocks, and resources to allocate.

15. The method of claim 1, wherein the trained model is deployed to perform channel prediction for one or more future time windows.

16. The method of claim 1, wherein the trained model is located in the base station, on-premises, at a remote server, or on a cloud server.

17. A system, comprising:
a processor configured to:
    obtaining data associated with a coverage area of a base station;
    training a model based in part on the obtained data associated with the coverage area;
    deploying the trained model to make inferences for one or more user equipment (UE) located in the coverage area; and
    utilize a corresponding recommended reference signal outputted by the trained model to decide on an approach for estimating corresponding channels associated with the one or more UE located in the coverage area; and
a memory coupled to the processor and configured to provide the processor with instructions.

18. The system of claim 17, wherein to obtain the data associated with the coverage area of the base station, the processor is configured to perform a plurality of channel state information-reference signal (CSI-RS) measurements and a plurality of sounding reference signal (SRS) measurements within the coverage area of the base station.

19. The system of claim 18, wherein the plurality of CSI-RS measurements and the plurality of SRS measurements are associated with the one or more UEs.

20. The system of claim 19, where the one or more UEs have a corresponding route.

21. A computer program product embodied in a non-transitory computer readable medium and comprising computer instructions for:
    obtaining data associated with a coverage area of a base station;
    training a model based in part on the obtained data associated with the coverage area;
    deploying the trained model to make inferences for one or more user equipment (UE) located in the coverage area; and
    utilizing a corresponding recommended reference signal outputted by the trained model to decide on an approach for estimating corresponding channels associated with the one or more UE located in the coverage area.

* * * * *